United States Patent [19]

Umemura et al.

[11] Patent Number: 5,438,108

[45] Date of Patent: Aug. 1, 1995

[54] GRAFT PRECURSOR AND PROCESS FOR PRODUCING GRAFTED AROMATIC POLYCARBONATE RESIN

[75] Inventors: Toshikazu Umemura; Takayuki Watanabe; Tatsuo Iwai, all of Tokyo; Motoyuki Sugiura, Anjou, all of Japan

[73] Assignees: Mitsubishi Gas Chemical Company, Inc.; NOF Corporation, both of Chiyoda, Japan

[21] Appl. No.: 187,158

[22] Filed: Jan. 25, 1994

[30] Foreign Application Priority Data

Jan. 26, 1993 [JP] Japan .................................. 5-029926

[51] Int. Cl.$^6$ ...................... C08F 283/02; C08L 69/00
[52] U.S. Cl. ..................... 525/467; 525/468; 525/146; 525/148; 525/63
[58] Field of Search ................ 525/146, 148, 467, 468

[56] References Cited

U.S. PATENT DOCUMENTS

| | | | |
|---|---|---|---|
| 4,962,148 | 10/1990 | Orikasa | 525/67 |
| 5,218,037 | 6/1993 | Orikasa | 525/67 |
| 5,244,973 | 9/1993 | Sakazume | 525/67 |

FOREIGN PATENT DOCUMENTS

| | | | |
|---|---|---|---|
| 031796 | 3/1978 | Japan | 525/468 |
| 117555 | 9/1979 | Japan | 525/468 |
| 56-131654 | 10/1981 | Japan | . |
| 58-180553 | 10/1983 | Japan | . |
| 62-138514 | 6/1987 | Japan | . |
| 63-196612 | 8/1988 | Japan | . |
| 63-312305 | 12/1988 | Japan | . |
| 63-312306 | 12/1988 | Japan | . |
| 1-113449 | 5/1989 | Japan | . |
| 1-113456 | 5/1989 | Japan | . |
| 1-131220 | 5/1989 | Japan | . |
| 1-138214 | 5/1989 | Japan | . |
| 1-252660 | 10/1989 | Japan | . |
| 1-256564 | 10/1989 | Japan | . |

*Primary Examiner*—David Buttner
*Attorney, Agent, or Firm*—Sughrue, Mion, Zinn, Macpeak & Seas

[57] ABSTRACT

A grafted aromatic polycarbonate resin is produced by melt-kneading a graft precursor comprising a mixture of 35 to 95% by weight of aromatic polycarbonate resin particles and 65 to 5% by weight of vinylic copolymer containing active oxygen, the vinylic copolymer being present in the aromatic polycarbonate resin particles, thereby subjecting to grafting reaction of the aromatic polycarbonate resin and the vinylic copolymer, where the grafting reaction can be sufficiently carried out and thus the grafted polycarbonate resin is useful for molding materials for optical disks, optical lenses, etc. a polymer blend-compatible agent, adhesives, paints, etc.

4 Claims, No Drawings

GRAFT PRECURSOR AND PROCESS FOR PRODUCING GRAFTED AROMATIC POLYCARBONATE RESIN

BACKGROUND OF THE INVENTION

1. Field of the Invention

The present invention relates to a graft precursor comprising aromatic polycarbonate resin and vinylic copolymer containing a radically polymerizable organic peroxide group in the molecule, and a process for producing grafted aromatic polycarbonate resin from the graft precursor.

The grafted aromatic polycarbonate resin obtained according to the present process can produce injection moldings with much less optical distortion owing to its distinguished transparency and flowability and is widely applicable to optical uses such as optical disks and optical lenses and also provides useful compositions for a compatibilizer, an adhesive, a paint, a coating agent and a modifying agent.

2. Related Prior Art

So far, known materials for transparent moldings directed to optical purposes include acrylic resin having good transparency and flowability and a small double refraction (JP-A-56-131654, etc.). However, the acrylic resin has such disadvantages as a low heat resistance, for example, up to 70° C., a low impact resistance and a high tendency for warping due to moisture.

To eliminate these disadvantages, it has been proposed to use polycarbonate resin having a viscosity average molecular weight of 15,000 to 18,000 as a molding material for disks, lenses, etc. (JP-A-58-180553), but the polycarbonate resin still has disadvantages such as insufficient flowability, etc., and thus has a limit to its applications.

In order to improve the flowability of aromatic polycarbonate resin, it has been proposed to melt-blend the aromatic polycarbonate resin with vinylic resin such as polystyrene, polymethylmethacrylate, AS resin, maleic anhydride-styrene copolymer, etc., but it is difficult to make dispersed particle sizes less than 1 μm due to the non-compatibility, resulting in optical uneven blends. It has been also proposed to use a vinylic monomer as a solvent for the aromatic polycarbonate resin and subject the aromatic polycarbonate resin to a bulk graft polymerization (JP-A-63-196612), where the dispersed particle sizes can be made less than 0.2 μm, but a large amount of washing solvent must be employed and post-treatments are complicated. It has been also proposed to conduct suspension graft polymerization (JP-A-62-138514), where the graft efficiency of the resulting resin compositions is smaller than that obtained by the bulk polymerization, and a high haze as an important property for optical materials is a problem.

A process for producing a graft precursor on the basis of a radically polymerizable organic peroxide is disclosed in JP-A-63-270713, JP-A-63-312305, JP-A-63-312306, JP-A-1-131220 and JP-A-1-138214, where the radically polymerizable organic peroxide is impregnated and polymerized in polypropylene or polyethylenic polymer. A method for utilizing the graft precursors as thermoplastic resin compositions is disclosed in JP-A-1-92252, JP-A-1-113449, JP-A-1-113456, JP-A-1-252660 and JP-A-1-256564, where the Tg of each the resins to be impregnated with vinyl monomer, radically polymerizable organic peroxide, etc. is so low, for example, −8° C. for polypropylene and −125° C. for polyethylene (Encyclopedia of Polymer Science and Engineering, Second Edition, Vol. 7, page 185), that a sufficiently high impregnation temperature than the Tg of the resin to be impregnated can be selected owing to use of an aqueous suspension, and the resin molecules are more active, resulting in satisfactory impregnation and good uniform polymerization.

However, in the case of resins having a Tg higher than 100° C., such as aromatic polycarbonate resin, no impregnation temperature higher than 100° C. can be used for the aqueous suspension, and thus it has never been so far contemplated to impregnate the aromatic polycarbonate resin with vinyl monomer, radically polymerizable organic peroxide and polymerization initiators to conduct graft polymerization.

SUMMARY OF THE INVENTION

An object of the present invention is to provide a grafted polycarbonate resin on an industrial scale by impregnating aromatic polycarbonate resin with a vinyl monomer, a specific radically polymerizable organic peroxide and a polymerization initiator, then polymerizing the vinyl monomer and the radically polymerizable organic peroxide, thereby forming a graft precursor, and further polymerizing the graft precursor.

As a result of an extensive study of the graft precursor and the process for producing a grafted aromatic polycarbonate on the basis of the graft precursor, the present inventors have found unexpectedly that a graft precursor can be provided by impregnating aromatic polycarbonate resin with a vinyl monomer, a specific radically polymerizable organic peroxide and a polymerization initiator and then polymerizing the vinyl monomer and the radically polymerizable organic peroxide, and a grafted aromatic polycarbonate can be produced on the basis of the graft precursor, and have established the present invention.

Though the Tg of aromatic polycarbonate is considerably higher than that of polypropylene or polyethylene, the graft precursor can be formed by impregnation. Its mechanism has not been fully clarified yet, but it seems that the use of porous aromatic polycarbonate resin having a small particle size as a raw material would be one cause for forming the graft precursor.

According to the first aspect of the present invention, there is provided a graft precursor, which comprises a mixture of 35 to 95% by weight of aromatic polycarbonate resin particles and 65 to 5% by weight of the following vinylic copolymer containing active oxygen, the vinylic copolymer being present in the aromatic polycarbonate resin particles and being a random copolymer comprising at least one of structural units ($A_1$) and ($A_2$) represented by the following formulae:

wherein X represents $R_2$, Y represents $-C_6H_3R_7R_{11}$, $-COOR_8$, $-CN$, $-OCOR_9$ or $-CH_2COOR_8$, Z represents a hydrogen atom or $-COOR_8$, $R_2$ represents a hydrogen atom or a methyl group; $R_7$ and $R_{11}$ represent a hydrogen atom or an alkyl group having 1 to 3 carbon atoms or halogens; $R_8$ represents an alkyl group having 1 to 8 carbon atoms or a cycloalkyl group having 3 to 12 carbon atoms; and $R_9$ represents an alkyl group having 1 or 2 carbon atoms

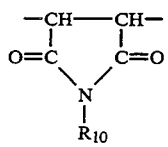

(A₂)

wherein $R_{10}$ represents an alkyl group having 1 to 12 carbon atoms, a cycloalkyl group having 3 to 12 carbon atoms or $-C_6H_4R_7$, and at least one of structural units (B₁) and (B₂) having the following formulae:

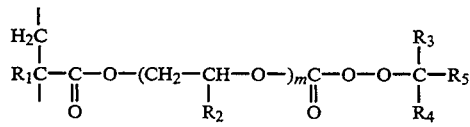

(B₁)

wherein $R_1$ represents a hydrogen atom or an alkyl group having 1 or 2 carbon atoms; $R_3$ and $R_4$ each represents an alkyl group having 1 to 4 carbon atoms; $R_5$ represents an alkyl group having 1 to 12 carbon atoms, a phenyl group, an alkyl-substitutedphenyl group or a cycloalkyl group having 3 to 12 carbon atoms; $R_2$ has the same meaning as defined above, referring to the formula (A₁); and m is 1 or 2,

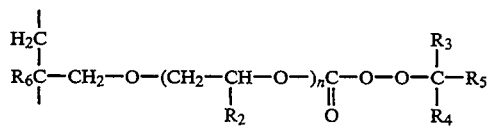

(B₂)

wherein $R_6$ represents a hydrogen atom or an alkyl group having 1 to 4 carbon atoms; $R_2$, $R_3$, $R_4$ and $R_5$ have the same meanings as defined above, referring to the formulae (A₁) and (B₁); and n is 0.1 or 2, a ratio of the structural units (B₁) and (B₂) to the structural units (A₁) and (A₂) being 0.1-10 parts by weight to 100 parts by weight and 0.01-0.73 parts by weight of the active oxygen being contained per 100 parts by weight of the structural units (A₁) and (A₂).

According to the second aspect of the present invention there is provided a process for producing a grafted aromatic polycarbonate resin, which comprises:

preparing an aqueous suspension of aromatic polycarbonate resin particles, adding at least one of vinyl monomers to the aqueous suspension, thereby making 35 to 95% by weight of the aromatic polycarbonate resin particles and 65 to 5% by weight of the vinyl monomers, further adding 0.1 to 10 parts by weight of at least one of radically polymerizable organic peroxides and 0.01 to 5 parts by weight of a radical polymerization initiator to the aqueous suspension per 100 parts by weight of the vinyl monomers, impregnating the aromatic polycarbonate resin particles with the vinyl monomers under conditions substantially incapable of decomposing the radically polymerizable organic peroxides and the radical polymerization initiator, then polymerizing the vinyl monomers and the radically polymerizable organic peroxides, thereby forming a vinylic copolymer and obtaining a graft precursor containing the vinylic copolymer in the aromatic polycarbonate resin particles, and melt-kneading the graft precursor at a temperature of 100° C. to 300° C., thereby subjecting the aromatic polycarbonate resin particles and the vinyl monomers to graft reaction and obtaining a grafted aromatic polycarbonate resin.

DETAILED DESCRIPTION OF THE INVENTION

The present invention will be described in detail below:

An aromatic polycarbonate resin for use in the present invention can be produced by the conventional process for producing an aromatic polycarbonate resin, that is, by a solution method including an interfacial polymerization method, a pyridine method, a chloroformate method, etc. and a melt method including a transesterification method, and has a viscosity average molecular weight of 2,000 to 100,000, preferably 5,000 to 50,000, more preferably 6,000 to 30,000.

In case of the solution method the resulting polycarbonate resin can be recovered from the aromatic polycarbonate resin solution after the reaction by solidification according to a procedure comprising adding a poor solvent to the aromatic polycarbonate resin solution, thereby precipitating the aromatic polycarbonate resin, a procedure comprising distilling the solvent off from the aromatic polycarbonate resin solution, thereby concentrating and solidifying the aromatic polycarbonate resin, a procedure comprising adding a poor solvent to the aromatic polycarbonate resin solution, suspending the resulting mixture in hot water with heating, thereby distilling the solvent and the poor solvent off and solidifying the aromatic polycarbonate resin, while forming an aqueous slurry of the aromatic polycarbonate resin, and circulating the aqueous slurry in the process of solidification through a wet pulverizer, thereby pulverizing the resin, or the like. In the present invention it is preferable to use the aqueous slurry of aromatic polycarbonate resin as an aqueous suspension of aromatic polycarbonate resin as it is.

A preferable dihydric phenol compound for use in the production of the present aromatic polycarbonate resin includes, for example, bis(4-hydroxyphenyl)methane, bis(4-hydroxyphenyl)ether, bis(4-hydroxyphenyl) sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl) propane, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane and bis(4-hydroxyphenyl) diphenylmethane.

In the present invention it is not objectionable at all to use aromatic polycarbonate resin having reactive unsaturated terminal groups. The aromatic polycarbonate resin having the unsaturated terminal groups can be prepared by the same method as that for producing the conventional aromatic polycarbonate resin, such as the solution method including an interfacial polymerization method, a pyridine method, a chloroformate method, etc., except for using a monofunctional compound having a double bond, as a molecular weight-adjusting agent or a terminal stopper, or together with the conventional terminal stopper.

The monofunctional compound having a double bond for introducing the unsaturated terminal groups includes, for example, unsaturated carboxylic acids such as acrylic acid, methacrylic acid, vinylacetic acid, 2-pentenoic acid, 3-pentenoic acid, 5-hexenoic acid, 9-decenoic acid, 9-undecenoic acid, etc., acid chlorides or chloroformates such as acrylic acid chloride, methacrylic acid chloride, sorbic acid chloride, allyl alcohol chloroformate, isopropenylphenol chloroformate, hydroxystyrene chloroformate, etc.; and phenols having an unsaturated group such as isopropenylphenol, hydroxystyrene, hydroxyphenyl maleimide, hydroxybenzoic acid allyl ester, hydroxybenzoic acid methylallyl ester, etc. These compounds may be used together with the conventional terminal stopper and an usually used 1 to 25% by mole, preferably 1.5 to 10% by mole, on the basis of one mole of the above-mentioned dihydric phenol compound.

The present aromatic polycarbonate resin is produced from the above-mentioned essential components and can be modified into a branched polycarbonate resin by using 0.01 to 3% by mole, particularly 0.1 to 1.0% by mole, of a branching agent on the basis of one mole of the above-mentioned dihydric phenol compounds. The branching agent includes, for example, polyhydroxy compounds such as fluoroglycine, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl) benzene, 1,1,1-tri(4-hydroxyphenyl)ethane, 2,6-bis(2-hydroxy-5-methylbenzyl)-4-methylphenol, α, α', α''-tri(4-hydroxyphenyl)1,3,5-triisopropylbenzene, etc., and 3,3-bis(4-hydroxyallyl)oxyindol(=isatinbisphenol), 5-chloroisatinbisphenol, 5,7-bromoisatinbisphenol, 5-bromoisatinbisphenol, etc.

The present aromatic polycarbonate resin is preferably in a powdery form or a pellet form having particle sizes of about 0.1 to about 5 mm. In case of excessively large particle sizes, it is difficult to obtain good dispersion in the suspension and also the impregnation time with vinyl monomer is disadvantageously prolonged. Porous aromatic polycarbonate resin is more preferable for the impregnation.

It is preferable that the present vinyl monomers are stable in water and insoluble in water and have a low affinity to water.

For example, at least one of vinyl aromatic monomers, maleimides, methacrylic acid ester or acrylic acid ester monomers, glycidyl methacrylate, acrylonitrile, methacrylonitrile and vinyl ester monomers can be used. The vinyl aromatic monomer includes, for example, styrene; alkyl-substituted styrenes such as o-methylstyrene, p-methylstyrene, α-methylstyrene, o-butylstyrene, p-butylstyrene, 2,4-dimethylstyrene, etc., and halogenated styrenes such as chlorostyrene, bromostyrene, etc.

The maleimides include, for example, N-alicyclic maleimides such as N-cyclohexylmaleimide, etc; N-aliphatic maleimides such as N-methylmaleimide, N-n-butylmaleimide, N-hexylmaleimide, N-tert-butylmaleimide, etc.; and N-aromatic maleimides such as N-phenylmaleimide, N-(p-methylphenyl)maleimide, N-benzylmaleimide, etc.

The methacrylic acid ester or acrylic acid ester monomer includes, for example, methacrylic acid alkyl ester or acrylic acid alkyl ester such as methyl methacrylate, ethyl methacrylate, butyl acrylate, n-hexyl acrylate, cyclohexyl methacrylate, etc.

The vinyl ester monomer includes, for example, fumaric acid esters such as diethyl fumarate, diisopropyl fumarate, di-n-butyl fumarate, di-2-ethylhexyl fumarate, etc.; maleic acid esters such as dimethyl maleate, diethyl maleate, diisopropyl maleate, di-n-butyl maleate, di-2-ethylhexyl maleate, etc.; and itaconic acid esters such as diethyl itaconate, di-n-butyl itaconate, di-2-ethylhexyl itaconate, etc.

It is desirable that at least 50% by weight of the vinyl monomer are vinyl aromatic monomers, preferably styrene and a substituted styrene and less than 50% by weight of the vinyl monomer is at least one of maleimides and vinyl esters, preferably cyclohexylmaleimide and diisopropyl fumarate.

The vinyl monomer is used in an amount of 65–5% by weight, preferably 50–10% by weight.

A molecular weight-adjusting agent can be used for the vinyl monomers in the present invention. A suitable molecular weight-adjusting agent is an organic sulfur compound. The organic sulfur compound includes, for example, aliphatic compounds having 1 to 30 carbon atoms and aromatic compounds, for example, aliphatic mercaptans such as n-octylmercaptan, n-dodecylmercaptan, etc.; aromatic mercaptans; thioglycolic acid and its esters; ethylenethioglycolic acid and its esters; ethylenethioglycol, etc. 0.0001–5 parts by weight, preferably 0.01–1 parts by weight, of the molecular weight-adjusting agent is used per 100 parts by weight of the vinyl monomers.

The radical polymerization initiator for use in the present invention is the one having a decomposition temperature of 40°–90° C., preferably 50°–80° C., for obtaining a half-life of 10 hours. The decomposition temperature for obtaining a half-life of 10 hours is a temperature at which a decomposition percentage of 50% is obtained 10 hours after 0.1 mole of the radical polymerization initiator is added to 1 l of benzene.

The radical polymerization initiator includes, for example, diisopropyl peroxydicarbonate, di-n-propyl peroxydicarbonate, dimyristyl peroxydicarbonate, di(2-ethoxyethyl) peroxydicarbonate, di(methoxyisopropyl)peroxydicarbonate, di(2-ethylhexyl) peroxydicarbonate, t-hexyl peroxyneodecanoate, di(3-methyl-3-methoxybutyl) peroxydicarbonate, t-butyl peroxyneodecanoate, t-hexyl peroxyneohexanoate, t-butyl peroxyneohexanoate, 2,4-dichlorobenzoyl peroxide, t-hexyl peroxypivalate, t-butyl peroxypivalate, 3,5,5-trimethylhexanoyl peroxide, octanoyl peroxide, lauroyl peroxide, cumyl peroxyoctoate, acetyl peroxide, t-butylperoxy-2-ethyl hexanoate, m-toluoyl peroxide, benzoyl peroxide, t-butyl peroxyisobutyrate, 1,1-bis(t-butylperoxy)-3,5,5-trimethylcyclo-hexane, etc. 0.01 to 5% by weight, preferably 0.05 to 3% by weight of the radical polymerization initiator is used on the basis of vinyl monomer.

The radically polymerizable organic peroxide for use in the present invention is compounds represented by the following general formula (I) and (II), whose decomposition temperature for obtaining the half-life of 10 hours in 90° to 110° C.:

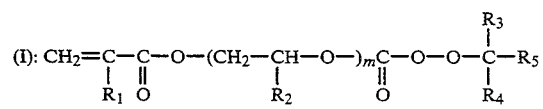

wherein $R_1$ represents a hydrogen atom or an alkyl group having 1 to 2 carbon atoms; $R_2$ represents a hydrogen atom or a methyl group; $R_3$ and $R_4$ each represents an alkyl group having 1 to 4 carbon atoms; $R_5$ represents an alkyl group having 1 to 12 carbon atoms, a phenyl group, an alkyl-substituted phenyl group or a cycloalkyl group having 3 to 12 carbon atoms; and m is 1 or 2, and

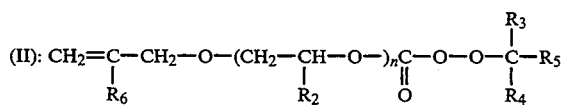

(II): $CH_2=C(R_6)-CH_2-O-(CH_2-CH(R_2)-O-)_n C(R_3)(R_4)-O-O-C(=O)-R_5$ wherein $R_6$ represents a hydrogen atom or an alkyl group having 1 to 4 carbon atoms; $R_2$ represents a hydrogen atom or a methyl group; $R_3$ and $R_4$ each represents an alkyl group having 1 to 4 carbon atoms; $R_5$ represents an alkyl group having 1 to 12 carbon atoms, a phenyl group, an alkyl-substitutedphenyl group or a cycloalkyl group having 3 to 12 carbon atoms; and n is 0, 1 or 2.

The compound represented by the formula (I) includes, for example, t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate, t-hexylperoxymethacryloyloxyethyl carbonate, 1,1,3,3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, p-isopropylcumylperoxyacryloyloxyethoxylethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylcumylperoxymethacryloyloxyethoxyethyl carbonate, t-butylperoxyacryloyloxyisopropyl carbonate, t-amylperoxyacryloyloxyisopropyl carbonate, t-hexylperoxyacryloyloxyisoproyl carbonate, 1,1,3,3-tetramethylbutylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylcumylperoxymethacryloyloxyisopropyl carbonate, etc.

The compound represented by (II) includes, for example, t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-hexylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-amylperoxymethallyloxyisopropyl carbonate, and t-hexylperoxymethallyloxyisopropyl carbonate. Among them, t-butylperoxyacryloyloxyethyl carbonate, t-butylperoxymethacryloyloxyethyl carbonate, t-butylperoxyallyl carbonate and t-butylperoxymethallyl carbonate are preferable.

0.1 to 10 parts by weight of the radically polymerizable organic peroxide is used per 100 parts by weight of the vinyl monomer. Below 0.1 part by weight, it is difficult to obtain a sufficient grafting effect, whereas above 10 parts by weight gel formation is unpreferably increased, though the grafting effect is. improved.

The vinylic copolymer for use in the present invention can be obtained by copolymerization of the vinyl monomer and the radically polymerizable organic peroxide, as mentioned above. The number average polymerization degree of the vinylic copolymer is 10 to 5,000, preferably 50–1,000. When the number average polymerization degree is below 10, the mechanical properties of the grafted aromatic polycarbonate resin are lowered, whereas above 5,000 moldability of the grafted aromatic polycarbonate resin is unpreferably deteriorated.

In the present invention, it is important to impregnate the aromatic polycarbonate resin with the vinyl monomer, the radically polymerizable organic peroxide and the radical polymerization initiator in an aqueous medium under such conditions that the radically polymerizable organic peroxide and the radical polymerization initiator are not substantially decomposed. When the radical polymerization initiator is decomposed during the impregnation, the molecular weights of graft precursors will be uneven. When the radically polymerizable organic peroxide is decomposed during the impregnation, the composition of graft precursors will be likewise uneven. Either is not preferable.

Impregnation of the aromatic polycarbonate resin with the vinyl monomer, the radically polymerizable organic peroxide and the radical polymerization initiator in an aqueous medium under such conditions that the radically polymerizable organic peroxide and the radical polymerization initiator are not substantially decomposed can be carried out according to the following procedures.

For example, according to one procedure the aromatic polycarbonate resin, the vinyl monomer, the radically polymerizable organic peroxide and the radical polymerization initiator are suspended in an aqueous medium and heated to such a temperature that no substantial decomposition of the radical polymerization initiator occurs, thereby impregnating the aromatic polycarbonate resin with the vinyl monomer, the radically polymerizable organic peroxide and the radical polymerization initiator. In order not to substantially decompose the radical polymerization initiator during the impregnation, it is preferable that the impregnation temperature is usually by at least 5° C. lower than the decomposition temperature of the radical polymerization initiator for obtaining a half-life of 10 hours.

According to another procedure, the aromatic polycarbonate resin, the vinyl monomer and the radically polymerizable organic peroxide are suspended in an aqueous medium and heated to such a temperature that no substantial decomposition of the radically polymerizable organic peroxide occurs, thereby impregnating the aromatic polycarbonate resin with the vinyl monomer and the radically polymerizable organic peroxide. It is preferable that the impregnation temperature is usually by at least 5° C. lower than the decomposition temperature of the radically polymerizable organic peroxide for obtaining a half-life of 10 hours. After the impregnation temperature is lowered to such a temperature that no substantial decomposition of the radical polymerization initiator occurs, the radical polymerization initiator is added thereto.

Anyway, it is important for making the molecular weights and the composition of the graft precursor uniform to prevent decomposition of the radical polymerization initiator and the radically polymerizable organic peroxide during the impregnation.

A suspending agent can be added to the aqueous medium, when required. The suspending agent includes, for example, polyvinyl alcohol, polyvinylpyrrolidone, methyl cellulose, polyacrylic acid and other water-soluble polymers; and calcium phosphate, sodium phosphate, potassium phosphate, magnesium oxide and other sparingly water-soluble inorganic substances.

The concentration of reactive components such as aromatic polycarbonate resin, etc. in the aqueous suspension is not limited, and usually 5 to 100 parts by weight of the reactive components are used in the aqueous suspension per 100 parts by weight of water.

Then, the temperature of the aqueous suspension is slowly elevated to a temperature at which the decomposition of the radical polymerization initiator starts, and the polymerization reaction is conducted thereby to form a graft precursor. The polymerization reaction is carried out, while keeping such a temperature for such a time that at least 50% of the radical polymerization initiator is decomposed and at least 50% of the vinyl monomer is converted. The amount of remaining radical polymerization initiator is usually 1 to 50% by weight, preferably not more than 20% by weight on the basis of the initial charge of the radical polymerization initiator.

After the polymerization reaction, the resulting graft precursor is recovered by solid-liquid separation, and then washed with water, hot water or the like, when required, and then dried.

The vinylic resin constituting the graft precursor must contain 0.01 to 0.73% by weight of active oxygen. When the active oxygen is less than 0.01% by weight, the grafting property of the graft precursor is considerably lowered, whereas above 0.73% by weight gel formation is increased during the grafting. Either is not preferable. The amount of active oxygen can be determined by iodometory.

Then, the graft precursor is melt-kneaded at a temperature of 100° C. to 350° C., thereby grafting the aromatic polycarbonate resin with the vinylic copolymer to produce grafted aromatic polycarbonate resin. The melt kneading can be carried out batchwise or continuously. The melt kneading is carried out at the above-mentioned temperature in an apparatus such as a Bambury mixer, an extruder, an injection molding machine, or the like. It is also possible to recover a portion of unreacted monomers by distillation under reduced pressure during the melt kneading. The graft precursor can be melt-kneaded together with a vinyl monomer unstable in water or with a vinyl monomer with a high affinity to water, such as maleic anhydride, acrylic acid, methacrylic acid, or the like. In this case, it is preferable to mix the graft precursor with these additives in advance, keep the resulting mixture for a predetermined time, thereby aging the mixture in a uniform dispersion.

It is also possible to add the grafted aromatic polycarbonate resin as a compatibilizer to the ordinary aromatic polycarbonate resin or a vinylic resin such as polystyrene, polymethyl methacrylate, AS resin, etc. and make the resulting mixture into a polymer alloy by melt kneading. In that case, 100 parts by weight of the grafted aromatic polycarbonate resin are melt-kneaded with 0 to 200 parts by weight of the aromatic polycarbonate or 0 to 100 parts by weight of the vinylic resin. The aromatic polycarbonate resin and the vinylic resin for use in forming the polymer alloy are not particularly limited, but a styrene resin is particularly preferable as a vinylic resin.

PREFERRED EMBODIMENTS OF THE INVENTION

Example 1

3.4 kg of sodium hydroxide was dissolved in 4.2 l of water, and further 6.6 kg of 2,2-bis (4-hydroxyphenyl)-propane (=BPA) and 8 g of hydrosulfite were dissolved therein while maintaining the temperature of the solution at 20° C. Then, 28 l of methylene chloride was added thereto, and 260 g of p-tert-butylphenol was added thereto with stirring. Then, 3.3 kg of phosgene was injected therein for 60 minutes.

After the completion of phosgene injection the reaction solution was vigorously stirred and emulsified. After the emulsification, 8 g of triethylamine was added thereto and the emulsion was stirred for about one hour to conduct polymerization.

The resulting polymerization mixture was separated into an aqueous phase and an organic phase. The organic phase was neutralized with phosphoric acid and repeatedly washed with water until pH of the washings became neutral. Then, 35 l of isopropanol was added thereto, thereby precipitating the polymerization product. The precipitates were recovered by filtration and then vacuum dried, whereby white powder of aromatic polycarbonate resin was obtained. The viscosity of the aromatic polycarbonate resin was measured, and it was found that the viscosity average molecular weight (Mv) was 16,000. The thus obtained resin will be hereinafter referred to as PC1.

500 g of powder of the aromatic polycarbonate resin PC1 was placed in a stainless steel autoclave having a net capacity of 5 l, and 2,500 ml of pure water and 1.25 g of polyvinyl alcohol PVA-224 (trademark of a product made by Kurare k.k., Japan; saponification degree: 88 mol %; viscosity at 4% concentration (20° C.): 44 cps) as a suspending agent were added thereto. 500 g of styrene monomer as a vinyl monomer was added thereto. 12.5 g of t-butylperoxymethacryloyloxyethyl carbonate ((Peromer: trademark of a product made by NOF corporation, Japan) whose decomposition temperature for obtaining a half-life of 10 hours was 105° C.) as a radically polymerizable organic peroxide and 2.5 g of benzoyl peroxide (whose decomposition temperature for obtaining a half-life of 10 hours was 74° C.) as a radical polymerization initiator were added thereto. The autoclave was kept at 60° to 65° C. and stirred for 2 hours, whereby the aromatic polycarbonate resin powder was impregnated with the styrene, the radically polymerizable organic peroxide and the radical polymerization initiator. Then, the temperature was elevated to 80° C. and stirring was further continued for 7 hours. At the end of the stirring, 78% of the radical polymerization initiator was decomposed and 90% of the styrene monomer was converted. The amount of the active oxygen, determined by iodometry, was 0.12% by weight on the basis of the vinylic resin.

The polymer powder was separated from the suspension, washed with hot water and sufficiently shook off water, whereby the polymer powder having a water content of 8% by weight was obtained. The thus obtained wet polymer powder was fed into a vent-type twin screw extruder (axial diameter: 30 mm; L/D=32) and extruded at a resin temperature of 220° C. The thus obtained pellets were transparent and will be hereinafter referred to as PC-PS1.

Then, the pellets were freeze-pulverized and subjected to extraction of non-grafted styrene monomer with n-heptane in Soxheat extractor, but the monomer was not substantially extracted. Furthermore, yield of styrene homopolymer was investigated by extraction with toluene, and it was found that 0.32 g of the polymer was extracted per 100 g of the polymer. IR analysis of the extracted polymer revealed that it was polystyrene.

Double refraction of lenses (3 mm thick) obtained by injection molding of the pellets was not more than 10 nm, and the optical distortion was very small. Total light beam transmissivity of lenses, was found to be 90% and haze 0.8%.

Example 2

Grafting reaction was carried out in the same manner as in Example 1, except that 2.5 g of t-butylperoxymethacryloyloxyethyl carbonate was used as the radically polymerizable organic peroxide.

The amount of active oxygen, determined by iodometry of the resulting graft precursor, was 0.023% by weight on the basis of the vinylic resin.

Moldings from the resulting pellets had a very small optical distortion. More specifically, double refraction of molded lenses (3 mm thick) was not more than 10 nm and total light beam transmissivity was found to be 89% and haze 1.0%.

Example 3

Grafting reaction was carried out in the same manner as in Example 1 except for composition of charged raw materials for the grafting reaction. Raw materials were charged in the following manner: 500 g of powder of aromatic polycarbonate resin was placed in a stainless steal autoclave having a net capacity of 5 l, and then 2,500 ml of pure water and 1.25 g of PVA-224 were added thereto. 350 g of styrene monomer as the vinyl monomer was added thereto. Furthermore, 17.5 g of t-butylperoxymethacryloyloxyethyl carbonate as the radically polymerizable organic peroxide, 2.5 g of benzoyl peroxide as the radical polymerization initiator and 0.34 g of n-dodecylmeraptan as a molecular weight-adjusting agent were added thereto.

The amount of active oxygen, determined by iodometry of the resulting graft precursor, was 0.25% by weight on the basis of the vinylic resin.

Moldings from the resulting pellets had a very small optical distortion. More specifically, double refraction of molded lenses (3 mm thick) was not more than 10 nm, and total light beam transmissivity was found to be 89.% and haze 1.1%.

Example 4

Aromatic polycarbonate resin was prepared in the same manner as in Example 1, except that 25 g of p-isopropenylphenol and 225 g of p-tert-butylphenol were used in place of 260 g of p-tert-butylphenol. The thus obtained aromatic polycarbonate resin had a viscosity average molecular weight (Mv) of 17,000 and will be hereinafter referred to as PC2.

Grafting reaction was then carried out in the same manner as in Example 1 and the resulting resin was purified.

The amount of active oxygen, determined by iodometry of graft precursor obtained on the way of the reaction, was 0.055% by weight on the basis of the vinylic resin.

Moldings from the ultimately obtained pellets were transparent and had a very small optical distortion. More specifically double refraction of molded lenses (3 mm thick) was not more than 10 nm, and total light beam transmissivity was 88% and haze 1.4%.

Example 5

500 g of aromatic polycarbonate resin PC1 was placed in a stainless steel autoclave having a net capacity of 5 l, and 2,500 ml of pure water, 1.25 g of PVA-224, 500 g of styrene monomer and 12.5 g of t-butylperoxymethacryloyloxyethyl carbonate as a radically. polymerizable organic peroxide were added thereto. Then, the temperature of the autoclave was kept at 90° C. and stirred for one hour, whereby the polycarbonate was impregnated with the styrene and the radically polymerizable organic peroxide.

Then, the temperature of the autoclave was lowered to 65° C., and 2.5 g of benzoyl peroxide (whose decomposition temperature for obtaining a half-life of 10 hours was 74° C.), as a radical polymerization initiator was added thereto. The temperature of the autoclave was kept at 60° to 65° C. and stirred for one hour, whereby the powder of the aromatic polycarbonate resin was impregnated with the radical polymerization initiator. Then, the temperature was elevated to 80° C. and stirring was further continued for 7 hours.

Then, the resulting polymer powder was separated from the suspension in the same manner as in Example 1, washed with hot water and sufficiently shook off water.

The amount of active oxygen, determined by iodometry of the thus obtained graft precursor, was 0.13% by weight on the basis of the vinylic resin.

Then, the resulting wet powder (graft precursor) was fed to a vent-type twin screw extruder and extruded at a resin temperature of 220° C. The resulting pellets were transparent. Double refraction of lenses obtained by injection molding of the pellets (3 mm thick) was not more than 10 nm and the optical distortion was very small. Total light beam transmissivity of lenses was found to be 90%, and haze 0.7%.

Example 6

Grafting reaction was carried out in the same manner as in Example 5 except that 458 g of styrene monomer and 42g of cyclohexyl maleimide were used in place of 500 g of styrene monomer.

The amount of active oxygen, determined by iodometry of the thus obtained graft precursor, was 0.12% by weight on the basis of the vinylic resin.

Furthermore, the wet powder (graft precursor) was fed to a vent-type, twin screw extruder and extruded at a resin temperature of 220° C. The resulting pellets were transparent.

Double refraction of lenses obtained by injection molding the pellets (3 mm thick) was not more than 10 nm and the optical distortion was very small. Total light beam transmissivity of lenses was found to be 90% and haze 0.8%.

Example 7

500 g of the styrene-grafted polycarbonate resin PC-PS1 obtained in Example 1 and 500 g of the polycarbonate prepared in Example 1 were melt-kneaded at 250° C. to produce pellets.

Moldings obtained by injection molding of the thus obtained pellets were transparent and had a small optical distortion. More specifically, double refraction of molded lenses (3 mm thick) was not more than 10 nm and total light beam transmissivity was found to be 90% and haze 0.8%.

pellets—Moldings obtained by injection moldings of the thus obtained pellets were transparent and had a small optical distortion. More specifically, double refraction of molded lenses (3 mm thick) was not more than 10 nm and total light beam transmissivity was found to be 88% and haze 1.5%.

Comparative Example 1

Grafting reaction was carried out in the same manner as in Example 1 except that no t-butylperoxymethacryloyloxyethyl carbonate as a radically polymerizable organic peroxide was added. The resulting pellets were white-turbid and total light beam transmissivity of molded lenses was found to be 80% and haze 40%. Double refraction could not be measured.

Comparative Example 2

500 g of the polycarbonate prepared in Example 1 and 500 g of commercially available styrene-maleic anhydride copolymer resin (Dylark #332) were melt-kneaded at 250° C. to produce pellets.

Lenses obtained by injection molding of the pellets had a large optical distortion. More specifically, double refraction of molded lenses (3 mm thick) was locally different and was in a range of 50 nm to 100 nm.

Raw materials and their compositions, grafting reaction conditions, active oxygen content of graft precursor, and physical properties of moldings are summarized in the following Table 1 for Examples 1 to 6 and Comparative Example 1 and in the following Table 2 for Examples 7 and 8 and Comparative Example 2.

TABLE 1

|  | Ex. 1 | Ex. 2 | Ex. 3 | Ex. 4 | Ex. 5 | Ex. 6 | Comp. Ex. 1 |
| --- | --- | --- | --- | --- | --- | --- | --- |
| PVA | 1.25 g | 1.25 g | 1.25 g | 1.25 g | 1.25 g | 1.25 g | 1.25 g |
| (%/water) | (0.05) | (0.05) | (0.05) | (0.05) | (0.05) | (0.05) | (0.05) |
| PC | PC1 | PC1 | PC1 | PC2 | PC1 | PC1 | PC1 |
|  | 500 g | 500 g | 500 g | 500 g | 500 g | 500 g | 500 g |
| Water | 2500 ml | 2500 ml | 2500 ml | 2500 ml | 2500 ml | 2500 ml | 2500 ml |
| Vinyl monomer | ST 500 g | ST 500 g | ST 350 g | ST 500 g | ST 500 g | ST 458 g | ST 458 g |
| Vinyl monomer | — | — | — | — | — | CHMI 42 g | — |
| Peromer | 12.5 g | 2.5 g | 17.5 g | 12.5 g | 12.5 g | 12.5 g | — |
| (/ST) | (2.5%) | (0.5%) | (5.0%) | (2.5%) | (2.5%) | (2.5%) | — |
| BPO | 2.5 g | 2.5 g | 2.5 g | 2.5 g | 2.5 g | 2.5 g | 2.5 g |
| (/ST) | (0.5%) | (0.5%) | (0.7%) | (0.5%) | (0.5%) | (0.5%) | (0.5%) |
| RSH | — | — | 0.35 g | — | — | — | — |
| (/ST) |  |  | (0.1%) |  |  |  |  |
| Charging | Bulk A | Bulk A | Bulk A | Bulk A | Divided | Divided | Bulk B |
| Impregnation temp. | 60~65° C. | 60~65° C. | 60~65° C. | 60~65° C. | 90° C./65° C. | 90° C./65° C. | 60~65° C. |
| Impregnation time | 2 Hr | 2 Hr | 2 Hr | 2 Hr | 1/1 Hr | 2 Hr | 2 Hr |
| Reaction temp. | 90° C. | 90° C. | 90° C. | 90° C. | 90° C. | 90° C. | 90° C. |
| Reaction time | 7 Hr | 7 Hr | 7 Hr | 7 Hr | 7 Hr | 7 Hr | 7 Hr |
| Active oxygen content in precursor | 0.12% | 0.023% | 0 25% | 0.12% | 0.13% | 0.12% | — |
| Double refraction | <10 nm | <10 nm | <10 nm | <10 nm | <10 nm | <10 nm | — |
| T/H (%/%) | 90/1.0 | 89/1.2 | 89/1.3 | 88/1.6 | 90/1.0 | 90/0.8 | 80/40 |

Note:
PC in Ex. 1 is PC prepared in Example 1.
PC in Ex. 4 is PC prepared in Example 4.
CHMI: N-cyclohexyl maleimide
Peromer: t-butylperoxymethacryloyloxyethyl carbonate as a radically polymerizable organic peroxide
BPO: Polymerization initiator
RSH: mercaptan
Bulk A: PVA, PC, water, styrene, peromer, BPO and (RSH) were charged all at one time and subjected to impregnation at 60° to 65° C. for 2 hours.
Bulk B: PVA, PC, water, styrene, BPO and (RSH) were charged all at one time and subjected to impregnation at 60° C. to 65° C. for 2 hours.
Divided: PVA, PC, water, styrene and peromer were charged at first and subjected to impregnation at 90° C. for one hour, and then the temperature was lowered to 60° C. and then BPO was charged and impregnation was carried out at 65° C. for one hour.
Impregnation temperature and reaction temperature: ° C.
T/H: total light beam transmissivity (%)/haze (%)

Example 8

500 g of styrene-grafted polycarbonate resin PC-PS1 obtained in Example i and 150 g of commercially available styrene-maleic anhydride copolymer resin (Dylark #332: trademark of a product made by MTC ARCO, INC., Japan) were melt-kneaded at 250° C. to produce

TABLE 2

|  | Ex. 7 | Ex. 8 | Comp. Ex. 2 |
| --- | --- | --- | --- |
| PC | PC1 | — | PC1 |
|  | 500 g |  | 500 g |
| PC-PS | PC-PS1 | PC-PS1 | — |

TABLE 2-continued

|  | Ex. 7 | Ex. 8 | Comp. Ex. 2 |
| --- | --- | --- | --- |
| Dailark 332 | 500 g<br>— | 500 g<br>Dylark 332 | —<br>Dylark 332 |
|  | 150 g | 500 g |  |
| Double refraction | <10 nm | <10 nm | 50~100 nm |
| (T/H) (%/%) | 90/0.8 | 88/1.5 | — |

In the present invention, grafting can be sufficiently carried out, and thus grafted aromatic polycarbonate resin useful for molding materials optical disks, optical lenses, etc., for polymer blend-compatible agents, adhesives, paints, etc. can be obtained. For example, when styrene is used as a vinyl polymer, particularly suitable polycarbonate resin molding materials for optical purpose can be obtained, and when styrene and/or (meth)acrylonitrile is used as a vinyl monomer, useful compatible agents and aromatic polycarbonate resin primers for surface coating can be obtained.

What is claimed is:

1. A process for producing a grafted aromatic polycarbonate resin, which comprises:

preparing an aqueous suspension of aromatic polycarbonate resin particles;

adding at least one vinyl monomer to the aqueous suspension, thereby making 35 to 95% by weight of the aromatic polycarbonate resin particles and 65 to 5% by weight of the at least one vinyl monomer, further adding 0.1 to 10 parts by weight of at least one radically polymerizable organic peroxide and 0.01 to 5 parts by weight of at least one radical polymerization initiator to the aqueous suspension per 100 parts by weight of the vinyl monomers, impregnating the aromatic polycarbonate resin particles with the at least one vinyl monomer under conditions substantially incapable of decomposing the at least one radically polymerizable organic peroxide and the at least one radical polymerization initiator, then polymerizing the at least one vinyl monomer and the at least one radically polymerizable organic peroxide, thereby forming a vinylic copolymer and obtaining a graft precursor containing the vinylic copolymer in the aromatic polycarbonate resin particles, and melt-kneading the graft precursor at a temperature of 100° C. to 300° C., thereby subjecting the aromatic polycarbonate resin particles and the at least one vinyl monomer to graft reaction and obtaining a grafted aromatic polycarbonate resin.

2. A process according to claim 1, wherein at least 50% by weight of the vinyl monomers are vinyl aromatic monomers.

3. A process according to claim 1, wherein less than 50% by weight of the vinyl monomers are at least one of maleimides and vinyl ester monomers.

4. A process according to claim 1, wherein the impregnation is carried out at an impregnation temperature by at least 5° C. lower than a decomposition temperature of the radically polymerizable organic peroxides or radical polymerization initiator for obtaining a half-life of 10 hours.

* * * * *